United States Patent
Etzler

(10) Patent No.: US 10,229,778 B2
(45) Date of Patent: Mar. 12, 2019

(54) ENGINE CONTROL SYSTEM AND METHOD FOR CONTROLLING ACTUATION OF SOLENOID VALVES

(71) Applicant: Continental Automotive Systems, Inc., Auburn Hills, MI (US)

(72) Inventor: Dirk Etzler, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 255 days.

(21) Appl. No.: 15/176,270

(22) Filed: Jun. 8, 2016

(65) Prior Publication Data

US 2017/0358387 A1 Dec. 14, 2017

(51) Int. Cl.
| | | |
|---|---|---|
| *F02D 41/20* | (2006.01) | |
| *H01F 7/06* | (2006.01) | |
| *F02M 51/06* | (2006.01) | |
| *F16K 31/06* | (2006.01) | |
| *F02D 41/26* | (2006.01) | |
| *F02D 41/22* | (2006.01) | |
| *F02D 41/24* | (2006.01) | |
| *F01L 25/08* | (2006.01) | |

(52) U.S. Cl.
CPC ............ *H01F 7/064* (2013.01); *F02D 41/20* (2013.01); *F02D 41/266* (2013.01); *F02M 51/06* (2013.01); *F16K 31/06* (2013.01); *F01L 25/08* (2013.01); *F02D 41/221* (2013.01); *F02D 41/2403* (2013.01); *F02D 2041/227* (2013.01); *F02D 2250/12* (2013.01)

(58) Field of Classification Search
USPC ........................................ 361/139, 144, 160
See application file for complete search history.

(56) References Cited

U.S. PATENT DOCUMENTS

| | | | |
|---|---|---|---|
| 5,233,964 A | 8/1993 | Jamoua et al. | |
| 5,829,412 A | 11/1998 | Klatt et al. | |
| 6,069,783 A * | 5/2000 | Mount ................... | F02D 41/004 123/490 |
| 9,160,490 B2 | 10/2015 | Hirotsu et al. | |
| 2012/0036922 A1 | 2/2012 | Bauerle et al. | |
| 2014/0121946 A1 | 5/2014 | Viele | |
| 2015/0057806 A1 | 2/2015 | Schweikert et al. | |
| 2017/0138292 A1* | 5/2017 | Schweikert ............. | F02D 41/26 |

FOREIGN PATENT DOCUMENTS

| | | |
|---|---|---|
| EP | 2119895 A1 | 11/2009 |
| EP | 2738375 A2 | 6/2014 |

OTHER PUBLICATIONS

International Search Report and the Written Opinion of the International Searching Authority for corresponding PCT application PCT/US2017/036119 dated Sep. 25, 2017.

* cited by examiner

*Primary Examiner* — Danny Nguyen

(57) ABSTRACT

An engine control system and method utilizes a processor and a valve controller in communication with the processor. A valve having a solenoid is in communication with the valve controller. The valve controller is configured to receive a combined selection and control signal from the processor, decode a desired electric current profile encoded in the signal, sense a control code encoded in the signal, and operate the solenoid in accordance with the decoded desired electric current profile in response to sensing the control code.

23 Claims, 8 Drawing Sheets

ENGINE CONTROL SYSTEM AND METHOD FOR CONTROLLING ACTUATION OF SOLENOID VALVES

TECHNICAL FIELD

The technical field relates generally to control techniques for solenoid valves and more particularly to controlling fuel injector valves in an internal combustion engine.

BACKGROUND

Internal combustion engines for vehicles often include injector valves for injecting fuel into the engine, e.g., directly into the cylinders. These injector valves are each typically driven by a solenoid. That is, a solenoid controls the opening and closing of the valve. The electric current supplied to the solenoid is controlled and adjusted to achieve desired performance of the engine. More particularly, the electric current supplied to the solenoid may be controlled based on one or more current profile definitions.

A dedicated application specific integrated circuit ("ASIC") may be utilized to control the valves. As such, the ASIC applies current to the solenoid according to one or more of the current profile definitions based on instructions and commands received from an external processor.

As such, it is desirable to present a system and method for efficiently controlling actuation of solenoid valves. In addition, other desirable features and characteristics will become apparent from the subsequent summary and detailed description, and the appended claims, taken in conjunction with the accompanying drawings and this background.

BRIEF SUMMARY

In one exemplary embodiment, a method of controlling actuation of a solenoid includes receiving a combined selection and control signal. The method also includes decoding a value encoded in the signal, the value corresponding to a desired electric current profile. The method further includes selecting a desired electric current profile from a plurality of electric current profiles based on the decoded value and in response to decoding the value. The method also includes sensing a control code encoded in the signal and operating the solenoid in accordance with the selected desired electric current profile in response to sensing the control code.

In one exemplary embodiment, an engine control system includes a processor and a valve controller in communication with the processor. The system also includes a valve having a solenoid in communication with the valve controller. The valve controller is configured to receive a combined selection and control signal from the processor, decode a desired electric current profile encoded in the signal, sense a control code encoded in the signal, and operate the solenoid in accordance with the decoded desired electric current profile in response to sensing the control code.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, a engine control system 100 and method 200 of controlling actuation of a solenoid 102 is shown and described herein.

Figure 1:
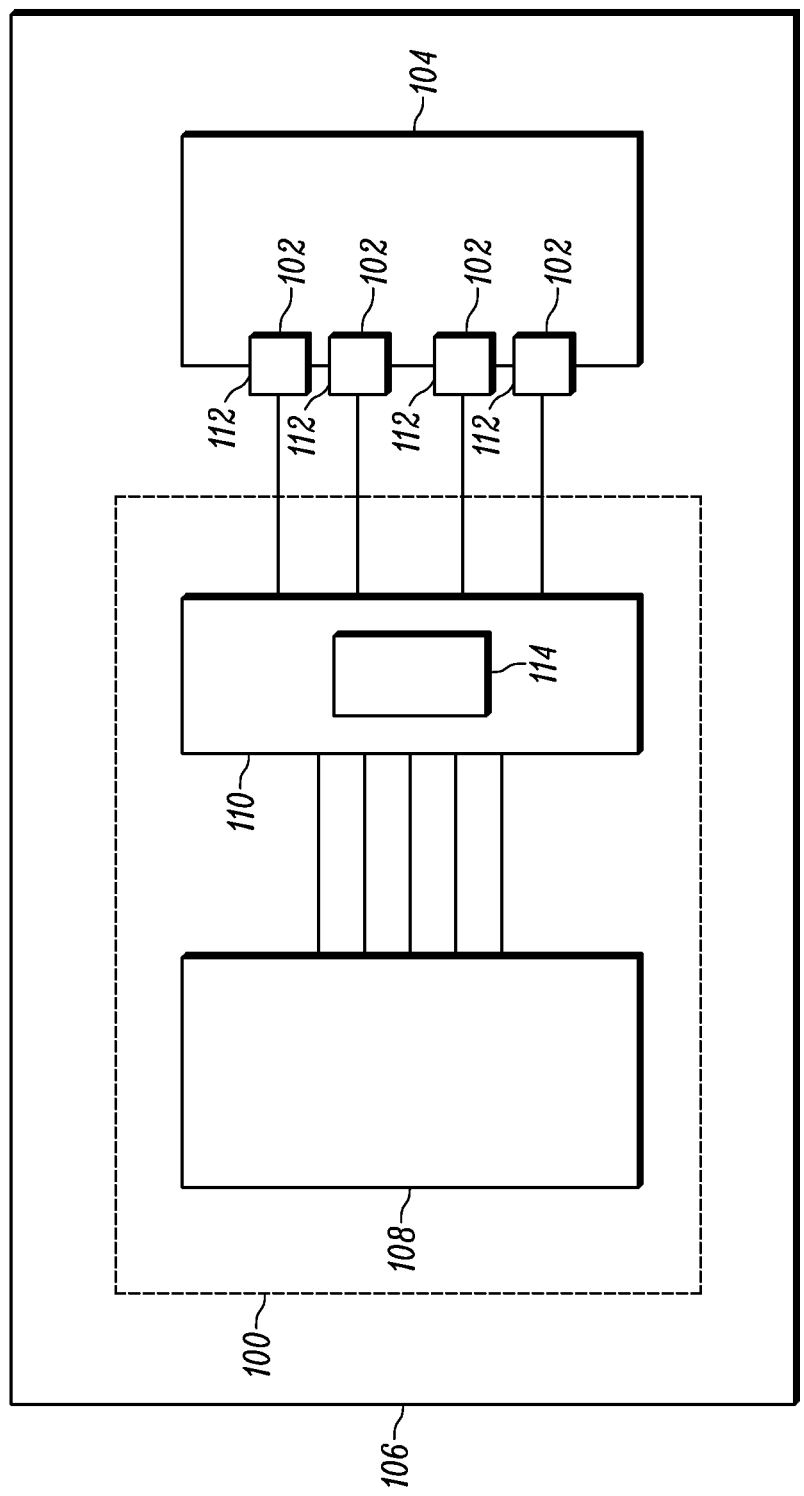
FIG. 1 is a block diagram showing an engine control system in a vehicle according to one exemplary embodiment.

Referring to FIG. 1, the engine control system 100 of the exemplary embodiment is utilized to control at least one aspect of an engine 104 of a vehicle 106. The engine 104 may be an internal combustion engine (not separately numbered) fueled with, for example, a petroleum product such as gasoline or diesel fuel. Of course, those skilled in the art appreciate that other fuels may be utilized with the engine 104 and/or that other types of engine 104 may be implemented. The vehicle 106 may be an automobile, truck, tractor, motorcycle, boat, aircraft, etc., as is readily appreciated by those skilled in the art.

The engine control system 100 includes a processor 108. The processor 108 is capable of performing calculations, manipulating data, and/or executing instructions, i.e., running a program. The processor 108 may be implemented with a microprocessor, microcontroller, application specific integrated circuit ("ASIC"), and/or other device(s) (not shown) as appreciated by those skilled in the art. The processor 108 may include a memory (not shown) for storing data and/or instructions as is also appreciated by those skilled in the art.

The engine control system 100 also includes a valve controller 110. In the exemplary embodiment, the valve controller 110 is independent from the processor 108 and is implemented with an ASIC (not separately numbered). However, it should be appreciated that the valve controller 110 may be implemented with other devices as appreciated by those skilled in the art.

The valve controller 110 is in communication with the processor 108. As such, instructions and/or data may be sent at least from the processor 108 to the valve controller 110, as described in greater detail below.

The valve controller 110 is also in communication with a valve 112. In the exemplary embodiment shown in FIG. 1, four valves 112 are utilized, each in communication with the valve controller 110. In this exemplary embodiment, the valves 112 are each direct injection valves 112 for directly injecting fuel into a cylinder (not shown) of the engine 104. However, it should be appreciated that the valves 112 may serve other purposes. For example, one or more of the valves 112 may be an intake valve for regulating air and/or fuel flow to the cylinder(s). Furthermore, for purposes of simplicity the valves 112 may be referred to herein in the singular as simply "the valve 112."

In the exemplary embodiment, the valve 112 includes the solenoid 102 mentioned above. As appreciated by those skilled in the art, the solenoid 102 actuates the valve 112 between positions, e.g., an open position and a closed position. That is, the solenoid 102 opens the valve to allow fluid to flow therethrough and closes the valve to prevent fluid from flowing. The solenoid 102 is in communication with the valve controller 110. As such, the valve controller 110 may send signals and/or other data to the valve 112 and/or the solenoid 102 to control actuation of the valve 112.

The valve controller 110 described above is configured to execute the method 200 of controlling actuation of the solenoid 102, as described below and with reference to FIG. 2. However, it should be appreciated that the method 200 described herein may be practiced with other devices besides the vehicle 106, engine 104, valve controller 110 and engine control system 100 described above.

Figure 3:
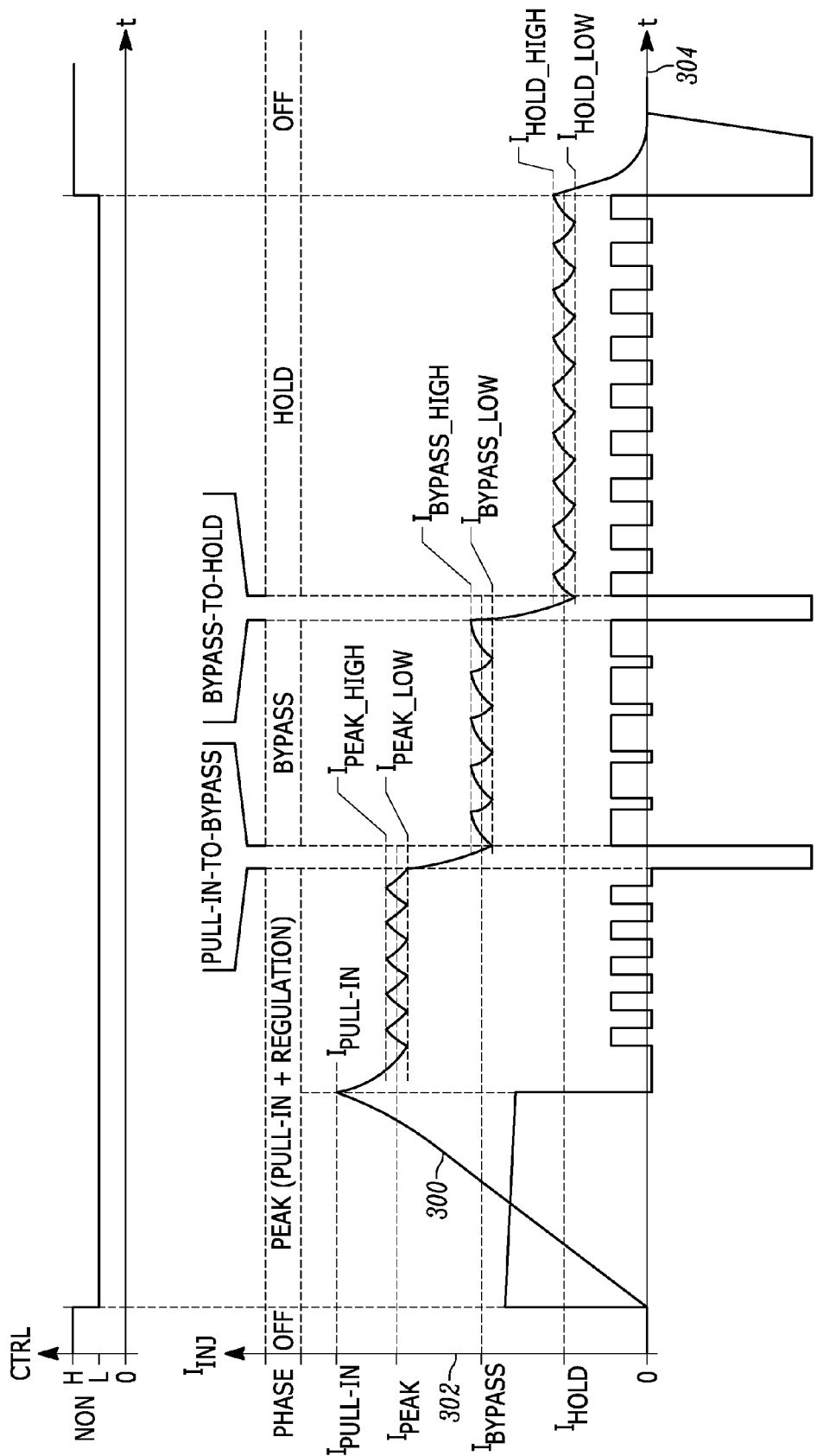
FIG. 3 is a graph showing an electric current profile of operating the solenoid according to one exemplary embodiment.
Figure 4:
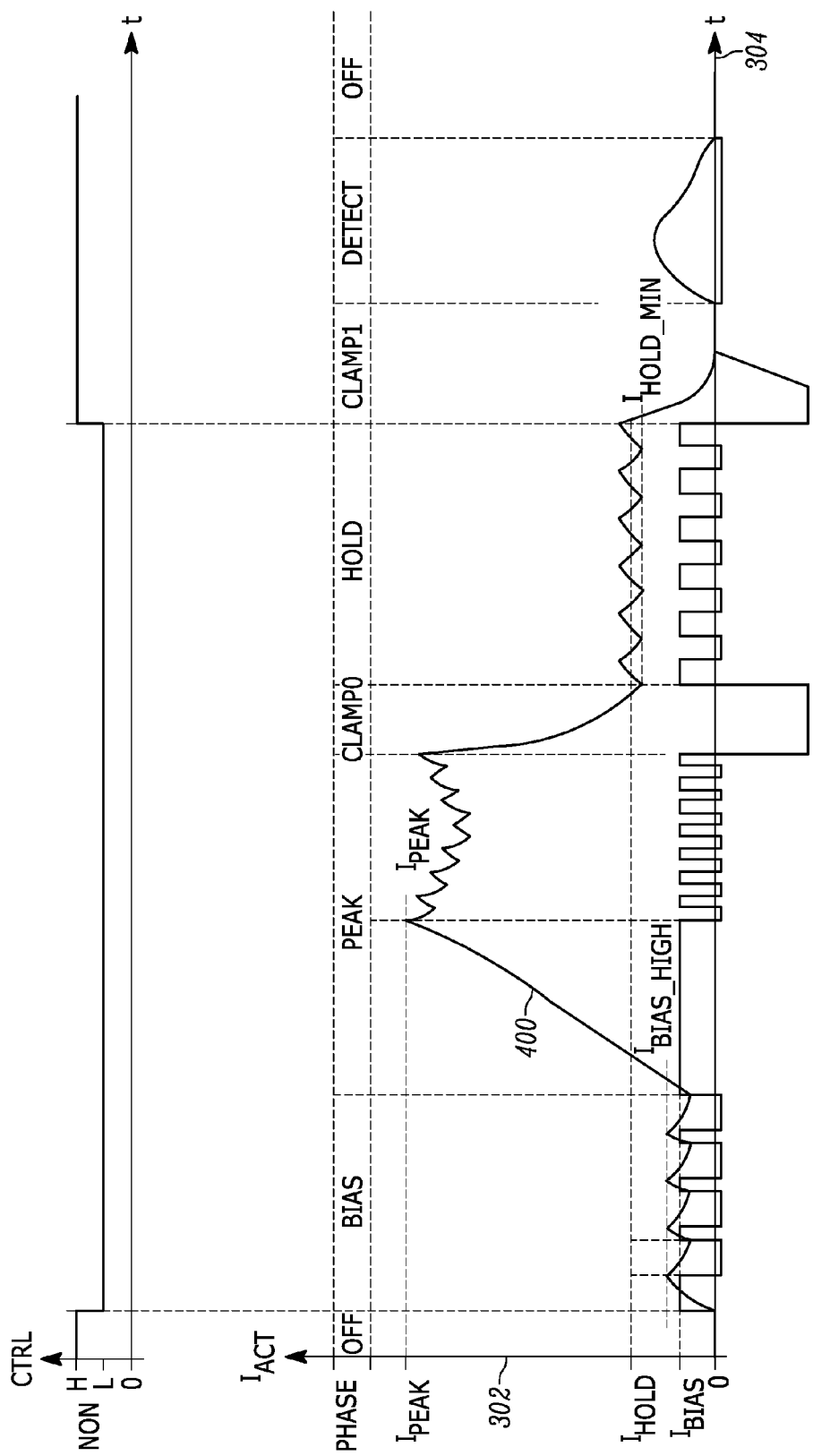
FIG. 4 is a graph showing an electric current profile of operating the solenoid according to another exemplary embodiment.

In the exemplary embodiments, the method 200 includes, at 202, receiving a plurality of electric current profiles and, at 204, storing the plurality of electric current profiles. More particularly, in the exemplary embodiments, these electric current profiles are sent from the processor 108 to the valve controller 110 and stored in a memory 114 of the valve controller 110. FIGS. 3 and 4 illustrate, respectively, two exemplary electric current profiles 300, 400. These electric current profiles 300, 400 define the current, represented by the vertical axis 302, applied to the solenoid 102 over a period of time, represented by the horizontal axis 304. In particular, the electric current profile 300 in FIG. 3 represents upper and lower current set points while the electric current profile 400 in FIG. 4 represents duty-cycle control during peak-phase for opening detection. Of course, numerous other electric current profiles may be implemented besides the two examples shown by curves 300 and 400.

Referring again to FIG. 2, the method 200 also includes, at 206, receiving a combined selection and control signal. In the exemplary embodiment, one combined selection and control signal is provided for each valve 112 and is received at the valve controller 110. The combined selection and control signal provides data regarding which of the plurality of electric current profiles 300, 400 should be implemented on the valve 112 as well as a control command to start and/or stop operation of the valve 112. Said another way, the combined selection and control signal informs the valve controller 110 which electric current profile should be implemented and when the actuation of the valve 112 should begin and/or end. FIGS. 5-8 illustrate four exemplary combined selection and control signals 500 along with the respective electric current profiles 300, 400 applied to the valves 112

The method 200 also includes, at 208, decoding a value encoded in the signal 500. The value corresponds to a desired electric current profile 300, 400. In the exemplary embodiments shown in FIGS. 5-8, decoding the value encoded in the signal 500 is achieved by counting a number of triggers 502 occurring in the signal 500 during a time period. Each trigger 502 may be realized with a falling edge 504 of the signal 500. As appreciated by those skilled in the art, the falling edge 504 refers to the signal going from a high voltage state (i.e., a "1") to a low voltage state (i.e., a "0"). Of course, the triggers 502 may be realized with other indicia, as appreciated by those skilled in the art.

In the exemplary embodiments, the time period, which is predetermined, begins in response to detecting a first falling edge 504. Furthermore, it should be appreciated that other techniques to encode and/or decode the value in the signal 500 may be implemented. As just one example, the value may be encoded in the signal 500 as a binary value, e.g., a binary coded digit.

Referring again to FIG. 2, the method 200 also includes, at 210, selecting a desired electric current profile 300, 400 from a plurality of electric current profiles 300, 400 based on the decoded value and in response to decoding the value. As alluded to above, the plurality of electric current profiles 300, 400 may be received and stored in the memory 114 prior to receiving the combined selection and control signal 500.

The method 200 further includes, at 212, sensing a control code 506 encoded in the signal 500. In the embodiments shown in FIGS. 5-8, sensing the control code is achieved by sensing a change in the state of the signal. More particularly, in the embodiments shown in FIGS. 5 and 6, sensing the control code is achieved by sensing a falling edge in the signal after the time period, while in the embodiments shown in FIGS. 7 and 8, sensing the control code is achieved by sensing a rising edge in the signal after the time period.

The method 200 also includes, at 214, operating the solenoid in accordance with the selected desired electric current profile and in response to sensing the control code. That is, when the control code is received, the solenoid 102 is operated with the electric current profile 300, 400 selected by the decoded value, as described above. By having the plurality of electric current profiles 300, 400 stored in the memory 114 prior to receiving the combined selection and control signal 500, the valve controller 110 may quickly implement the desired electric current profile 300, 400 once the value is decoded from the signal 500 and the control code 506 is recognized.

Figure 5:
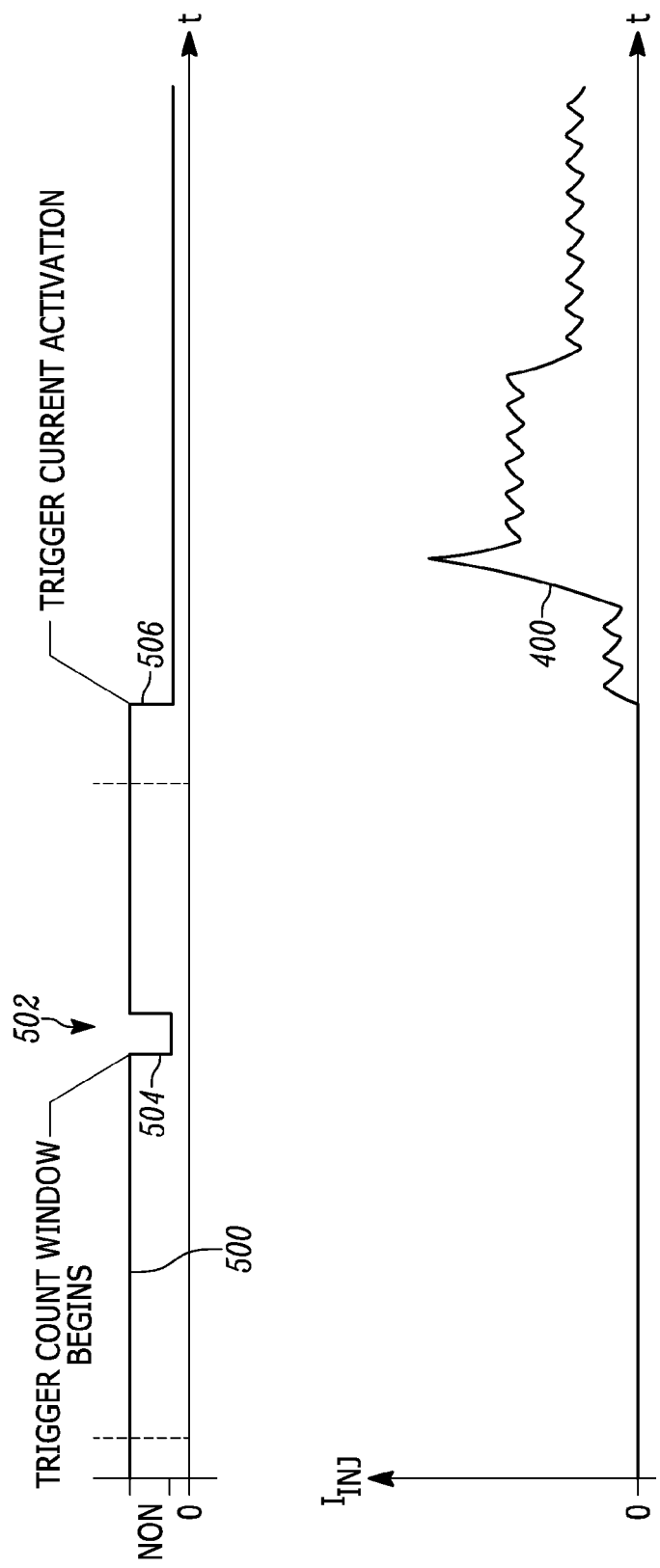
FIG. 5 is a graph showing selection of a first electric current profile and beginning operation of the solenoid according to the first electric current profile according to one exemplary embodiment.
Figure 6:
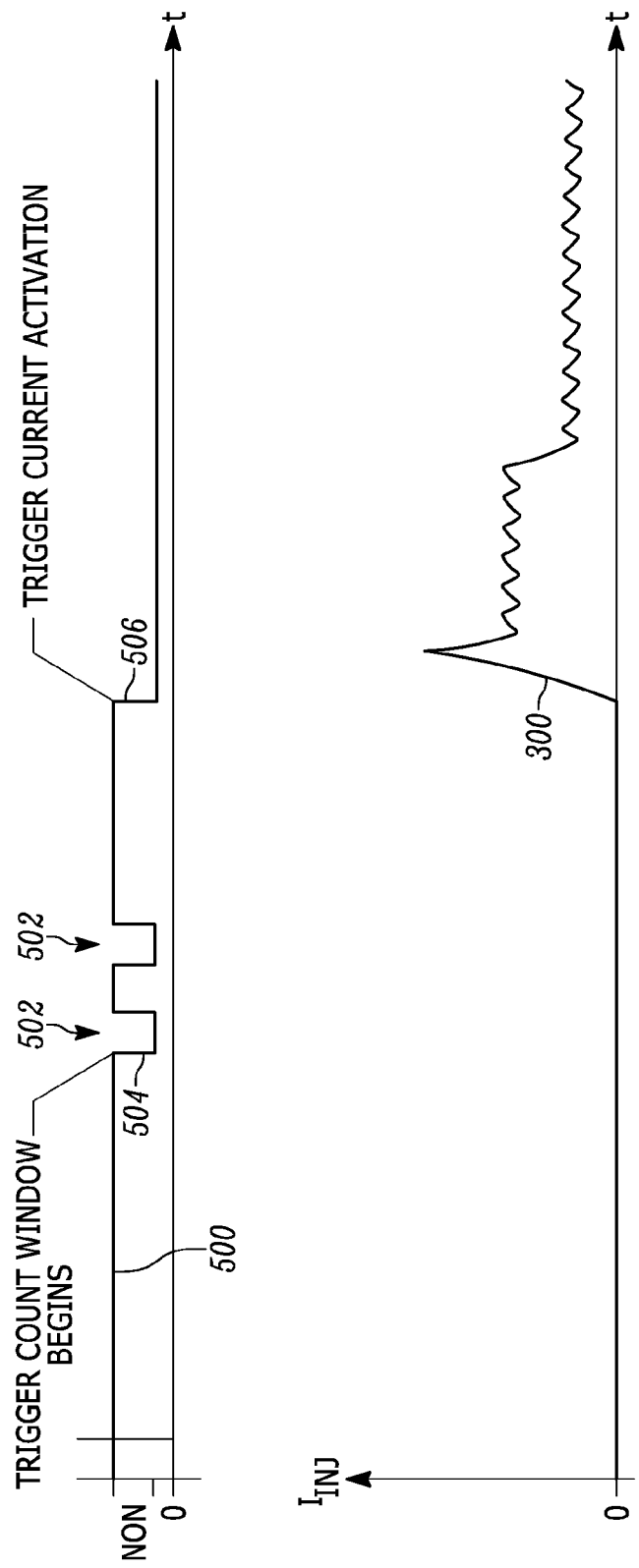
FIG. 6 is a graph showing selection of a second electric current profile and beginning operation of the solenoid according to the second electric current profile according to one exemplary embodiment.
Figure 7:
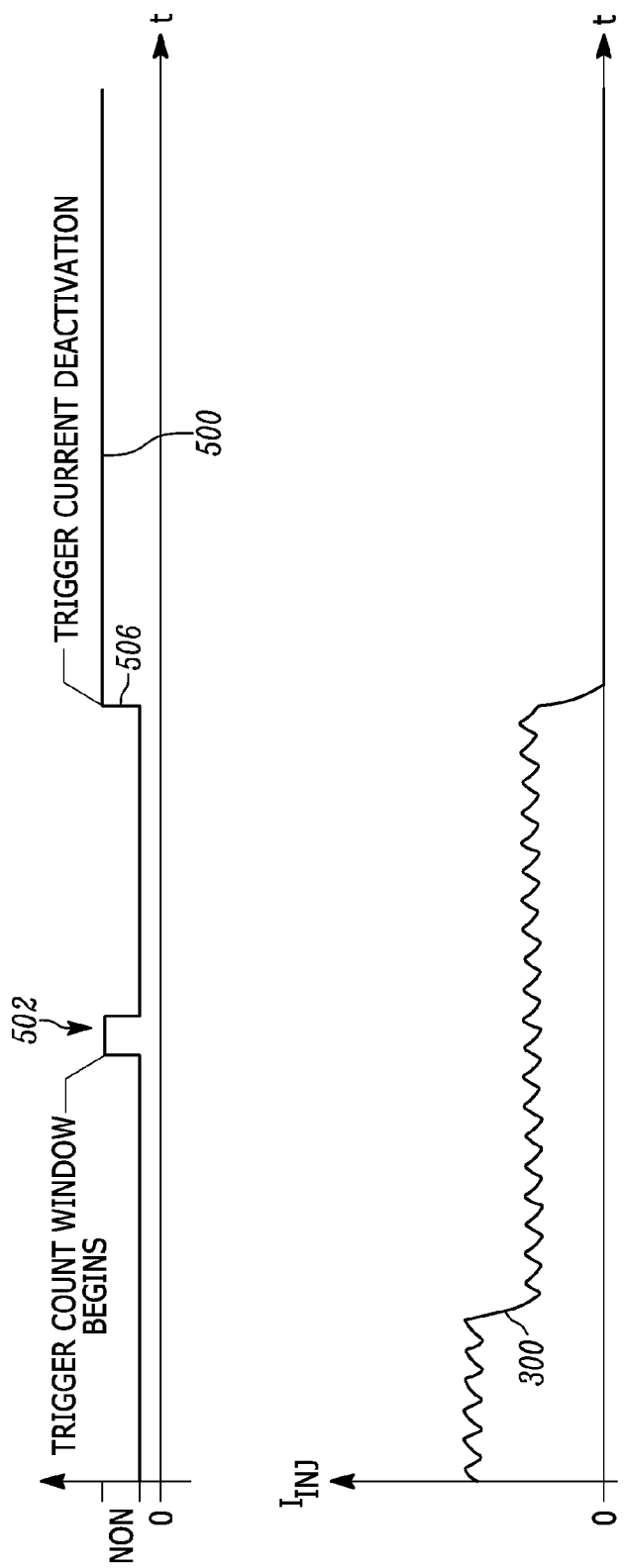
FIG. 7 is a graph showing selection of the first electric current profile and ending operation of the solenoid according to the first electric current profile according to one exemplary embodiment.
Figure 8:
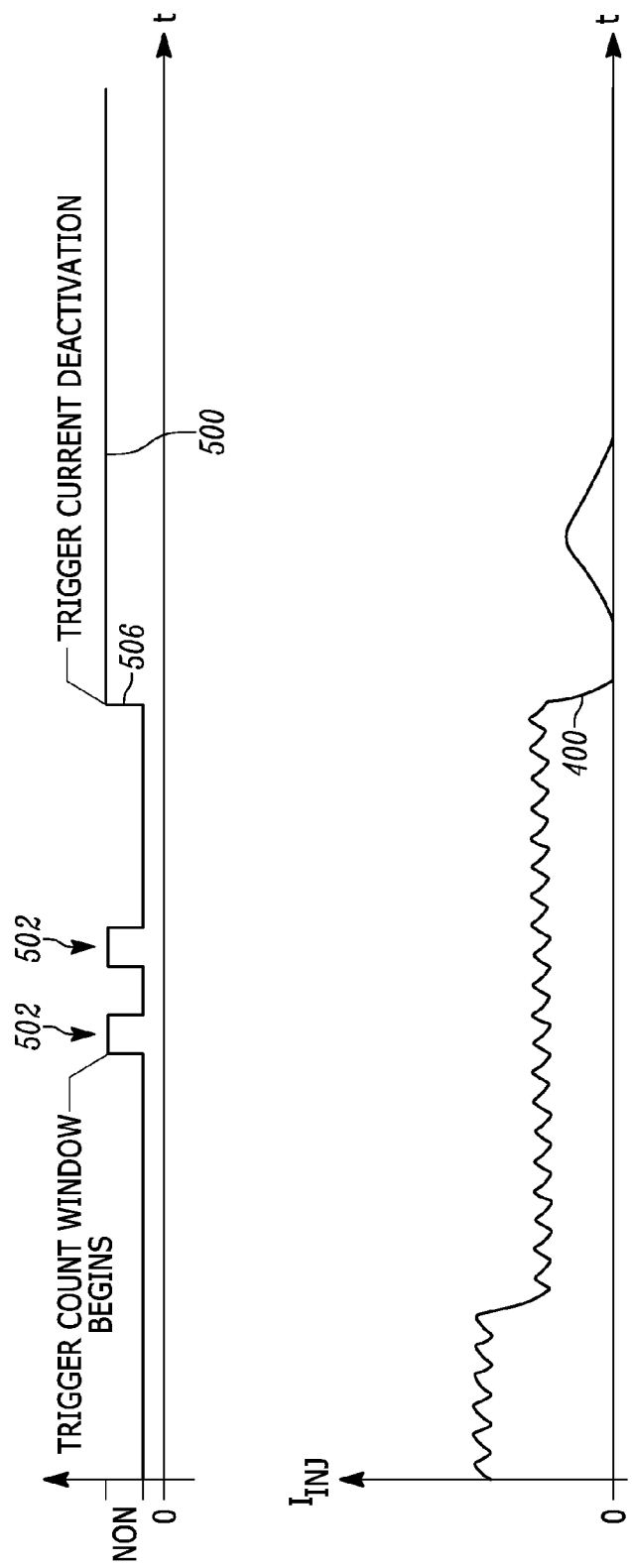
FIG. 8 is a graph showing selection of the second electric current profile and ending operation of the solenoid according to the second electric current profile according to one exemplary embodiment.

As shown in FIGS. 5 and 6, operating the solenoid 102 is further defined as starting operation of the solenoid 102 in accordance with the selected desired electric current profile 300, 400 in response to sensing the control code 506. That is, in these figures, the solenoid 102 is not operational, i.e., closed, and opens according to the electric current profile 300, 400 encoded in the signal 500. FIGS. 7 and 8, on the other hand, show operating the solenoid 102 by stopping operation of the solenoid in accordance with the selected desired electric current profile in response to sensing the control code. That is, FIGS. 7 and 8 show that the solenoid 102 as operational, i.e., open, and then is closed in response to the value being decoded and the control code 506 being recognized.

By utilizing a single combined selection and control signal 500, the control system 100 and method 200 may be implemented utilizing just one input pin (not numbered) on the valve controller 110 per solenoid 102 being controlled. This is advantageous as package size and complexity of ASIC implementation of the valve controller 110 is reduced, thus decreasing costs and increasing reliability.

Figure 2:
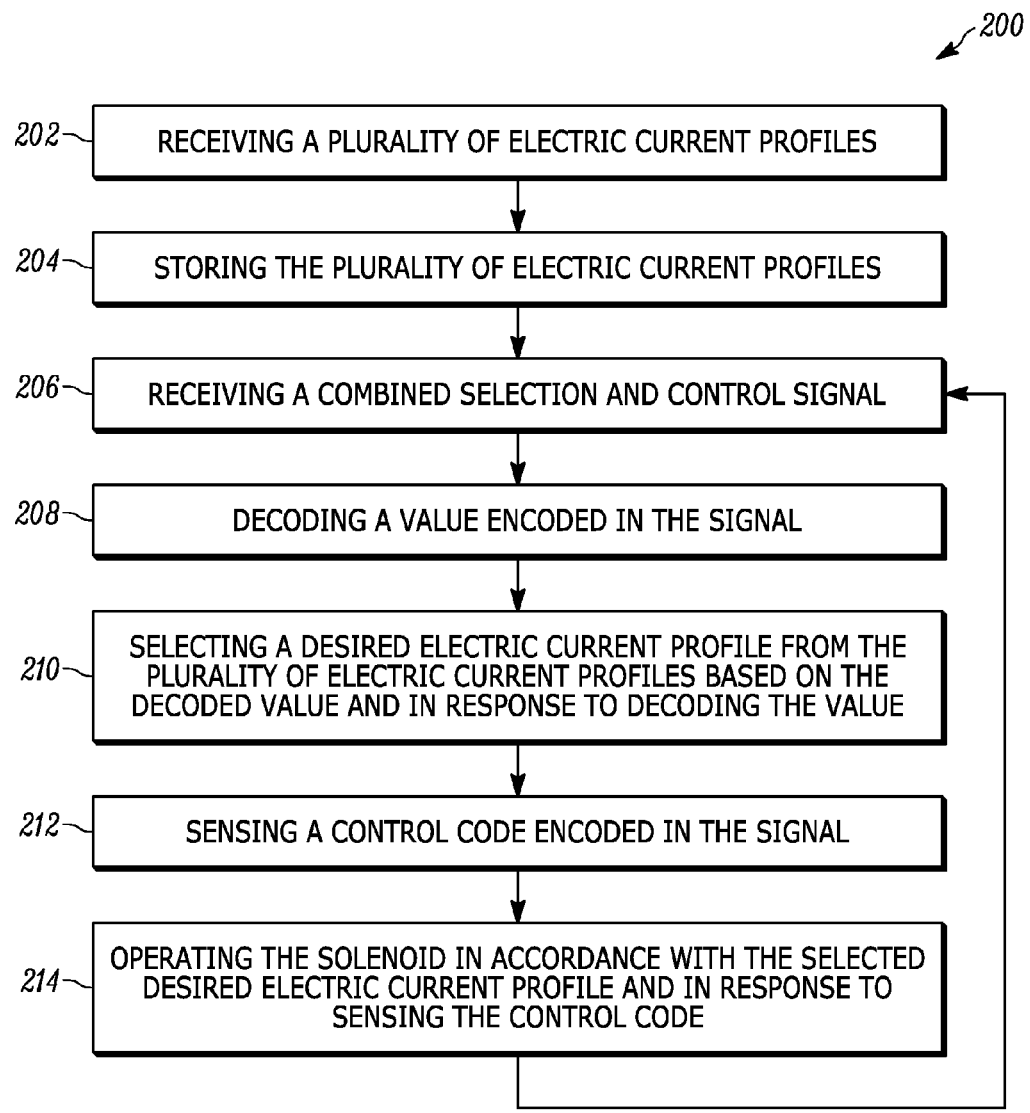
FIG. 2 is a flowchart showing a method of controlling actuation of a solenoid according to one exemplary embodiment.

Although not shown in FIG. 2, the method may also include prohibiting operation of the solenoid 102 in response to detecting an error in the combined selection and control signal 500. For example, when the valve controller 110 cannot properly decode the value or the control code 506 in the signal 500, then the solenoid 102 is not operated. As one example, if no rising edge is detected after the first falling edge in the signal 500, then no value or control code 506 is found, so actuation of the solenoid 102 is not begun. Likewise, if the number of rising and/or falling edges is too high, the actuation of the solenoid 102 should not be started and/or the actuation of the solenoid 102 should be ended. Those skilled in the art appreciate that such errors in the signal 500 may occur due to malfunctions in the processor 108, loose electrical connections, RF inference, etc.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of controlling actuation of a solenoid, said method comprising:
   receiving a combined selection and control signal;
   decoding a value encoded in the signal, the value corresponding to a desired electric current profile;
   selecting a desired electric current profile from a plurality of electric current profiles based on the decoded value and in response to decoding the value;
   sensing a control code encoded in the signal; and
   operating the solenoid in accordance with the selected desired electric current profile in response to sensing the control code.

2. The method as set forth in claim 1 wherein decoding the value encoded in the signal comprises counting a number of triggers occurring in the signal during a time period.

3. The method as set forth in claim 2 wherein counting a number of triggers comprises counting a number of rising edges in the signal during the time period.

4. The method as set forth in claim 3 wherein decoding the value encoded in the signal comprises sensing a first falling edge and wherein the time period begins in response to sensing the first falling edge.

5. The method as set forth in claim 4 wherein sensing the control code encoded in the signal comprises sensing a falling edge in the signal after the time period.

6. The method as set forth in claim 2 wherein counting a number of triggers comprises counting a number of falling edges in the signal during the time period.

7. The method as set forth in claim 6 wherein decoding the value encoded in the signal comprises sensing a first rising edge and wherein the time period begins in response to sensing the first rising edge.

8. The method as set forth in claim 7 wherein sensing the control code encoded in the signal comprises sensing a rising edge in the signal after the time period.

9. The method as set forth in claim 1 further comprising prohibiting operation of the solenoid in response to detecting an error in the combined selection and control signal.

10. The method as set forth in claim 1 wherein operating the solenoid comprises starting operation of the solenoid in accordance with the selected desired electric current profile in response to sensing the control code.

11. The method as set forth in claim 1 wherein operating the solenoid comprises stopping operation of the solenoid in accordance with the selected desired electric current profile in response to sensing the control code.

12. The method as set forth in claim 1 further comprising receiving the plurality of electric current profiles and storing the plurality of electric current profiles.

13. The method as set forth in claim 12 wherein receiving the plurality of electric current profiles comprises receiving the plurality of electric current profile prior to receiving a combined selection and control signal.

14. An engine control system comprising:
   a processor;
   a valve controller in communication with said processor; and
   a valve having a solenoid in communication with said valve controller;
   said valve controller configured to
      receive a combined selection and control signal from said processor,
      decode a value encoded in the signal,
      select a desired electric current profile from a plurality of current profiles based upon the decoded value,
      sense a control code encoded in the signal, and
      operate said solenoid in accordance with the selected desired electric current profile and the control code, in response to sensing the control code.

15. The system as set forth in claim 14 wherein the valve controller comprises an application specific integrated circuit.

16. The system as set forth in claim 14 wherein the valve controller is further configured to receive, prior to receiving the signal from the processor, the plurality of electric current profiles and store the plurality of electric current profiles.

17. The system as set forth in claim 14 wherein the valve is further defined as one of an injection valve and an intake valve.

18. The system of claim 14, wherein the valve controller is configured to decode the valve encoded in the signal by counting a number of one or more trigger edges in the signal during a period of time.

19. The system of claim 18, wherein the one or more trigger edges comprise one of one or more rising edges and one or more falling edges in the signal during the period of time.

20. The system of claim 18, wherein the valve controller is further configured to decode the value encoded in the signal by identifying a first edge in the signal, the first edge being an opposite edge relative to the one or more trigger edges, the first edge starting the period of time during which the one or more trigger edges are counted.

21. The system of claim 14, wherein the valve controller is configured to sense the control code by sensing an edge of signal following completion of the period of time.

22. The system of claim 14, wherein the valve controller is further configured to prohibit operation of the solenoid in response to detecting an error in the signal.

23. The system of claim 14, wherein the valve controller is configured to operate said solenoid by performing a stop operation thereof in accordance with the selected desired electric current profile and the sensed control code.

* * * * *